United States Patent
Li et al.

(10) Patent No.: US 9,294,156 B2
(45) Date of Patent: Mar. 22, 2016

(54) HANDHELD DEVICE HAVING MULTIPLE NFC READING DIRECTIONS

(71) Applicants: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

(72) Inventors: Cheng-Ta Li, Nantou (TW); Hung-Wei Chiu, Taichung (TW); Jui-Chih Chien, Chia Yi County (TW)

(73) Assignees: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Caotun Township, Nantou County (TW)

( * ) Notice: Subject to any disclaimer, the term of this patent is extended or adjusted under 35 U.S.C. 154(b) by 0 days.

(21) Appl. No.: 14/487,792

(22) Filed: Sep. 16, 2014

(65) Prior Publication Data

US 2015/0295623 A1    Oct. 15, 2015

(30) Foreign Application Priority Data

Apr. 11, 2014    (TW) .............................. 103113424 A

(51) Int. Cl.
*H04B 5/00* (2006.01)

(52) U.S. Cl.
CPC ............ *H04B 5/0081* (2013.01); *H04B 5/0031* (2013.01)

(58) Field of Classification Search
CPC .......................................................... H04B 5/02
USPC .................. 455/41.1, 575.1, 575.7, 573, 90.3
See application file for complete search history.

(56) References Cited

U.S. PATENT DOCUMENTS

| | | | | |
|---|---|---|---|---|
| 9,099,765 B2* | 8/2015 | Behin | ....................... | H01Q 7/00 |
| 2014/0009348 A1* | 1/2014 | Behin | ....................... | H01Q 7/00 343/726 |
| 2014/0273832 A1* | 9/2014 | Kim | ........................ | H02J 5/005 455/41.1 |
| 2014/0370804 A1* | 12/2014 | Dorning | ............... | H04B 5/0031 455/41.1 |
| 2015/0065114 A1* | 3/2015 | Dua | ................... | G06F 17/30058 455/418 |
| 2015/0145634 A1* | 5/2015 | Kurz | ....................... | H01F 38/14 336/232 |
| 2015/0145635 A1* | 5/2015 | Kurz | ....................... | H01F 38/14 336/232 |
| 2015/0162957 A1* | 6/2015 | Saghbini | .............. | H04B 5/0062 455/41.1 |
| 2015/0180542 A1* | 6/2015 | Jang | ...................... | H04B 5/0031 455/41.1 |

* cited by examiner

*Primary Examiner* — April G Gonzales
(74) *Attorney, Agent, or Firm* — Muncy, Geissler, Olds & Lowe PC

(57) ABSTRACT

A handheld device includes at least two NFC antennas provided with different RF transmission directions. The at least two NFC antennas are separated from each other and share one communication unit. In light of this, the handheld device exchange data with an external NFC device through the at least two NFC antennas to have more effective inductive coupling directions.

5 Claims, 2 Drawing Sheets

HANDHELD DEVICE HAVING MULTIPLE NFC READING DIRECTIONS

BACKGROUND OF THE INVENTION

1. Field of the Invention

The present invention relates generally to a handheld device and more particularly, to a handheld device having multiple near-field communication (NFC) reading directions.

2. Description of the Related Art

As the NFC antenna is developed, more and more handheld devices, such as mobile phones, are equipped with the NFC antennas to function as electronic tags or simulated credit cards. A conventional NFC antenna is usually mounted to an inner side of a back cover of the handheld device. Therefore, when a user intends to proceed with the service, such as simulated credit card, the user needs to aim the back cover of the handheld device at an external NFC device to make the NFC antenna inductively coupled with the external NFC device for data exchange. In the process of each data exchange, the user needs to make the NFC antenna face the same direction for inductive coupling with the external NFC. However, every user has his or her own custom and need and if the handheld device can provide different directions for inductive coupling, the operational convenience could be enhanced for the user.

In addition, back covers of some handheld devices are made of metal for the purpose of high-quality perception and design as a whole. The metallic back covers can though boost the thermal dissipation of the handheld device, but they lead to interference with the NFC antenna inductively coupled with the external NFC device for data exchange.

SUMMARY OF THE INVENTION

The primary objective of the present invention is to provide a handheld device which can be inductively coupled with signals of various radio frequency (RF) transmission directions, respectively, to further have more effective inductive coupling directions.

The foregoing objective of the present invention is attained by the handheld device comprising a communication unit, a first NFC antenna, and a second NFC antenna. The communication unit includes an input end and an output end and is connected with a first circuit and a second circuit in parallel. The first NFC antenna is mounted to the first circuit. The second NFC antenna is mounted to the second circuit and is provided with an RF transmission direction different from that of the first NFC antenna. The equivalent inductance between the input and output ends matches the communication unit.

The first and second NFC antennas are separated from each other in the handheld device and their RF transmission directions are different from each other, so more effective inductive coupling directions are enabled for the handheld device to exchange data with an external NFC device.

DETAILED DESCRIPTION OF PREFERRED EMBODIMENTS

Structural features and desired effects of the present invention will be more fully understood by reference to a preferred embodiment given hereunder. However, it is to be understood that the embodiment is given by way of illustration only, thus being not limitative of the claim scope of the present invention.

Figure 1:
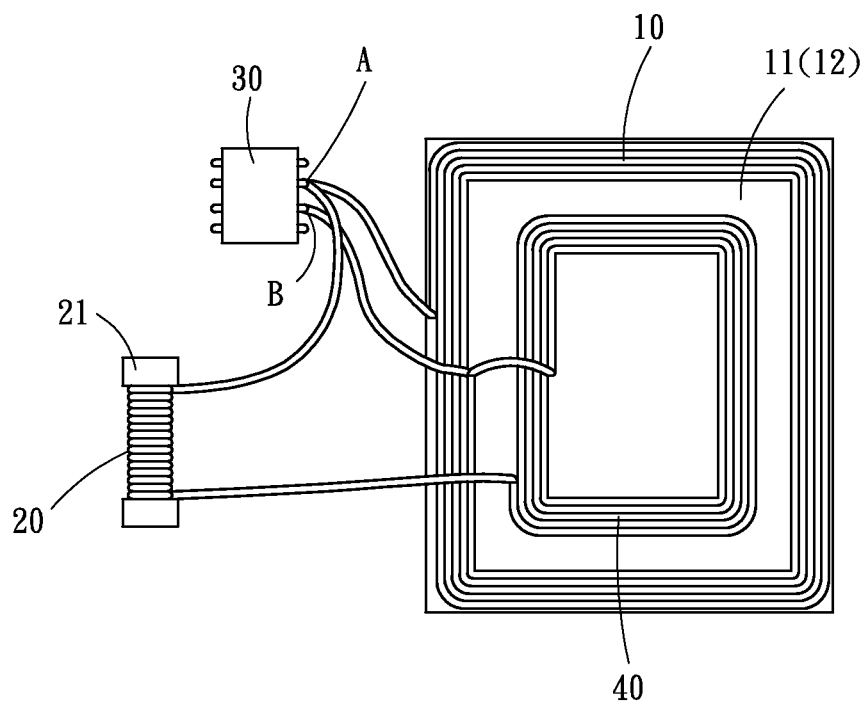
FIG. 1 is a schematic view of a first preferred embodiment of the present invention.
Figure 2:
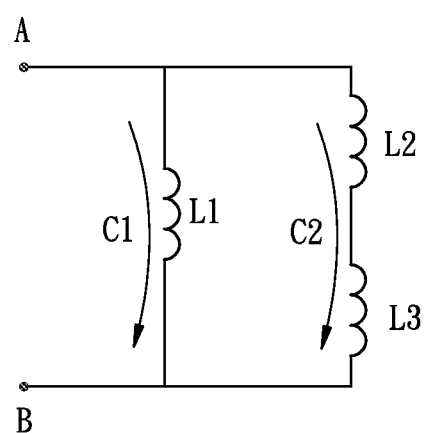
FIG. 2 is an equivalent circuit diagram of an NFC antenna through the communication unit in accordance with the first preferred embodiment of the present invention.
Figure 3:
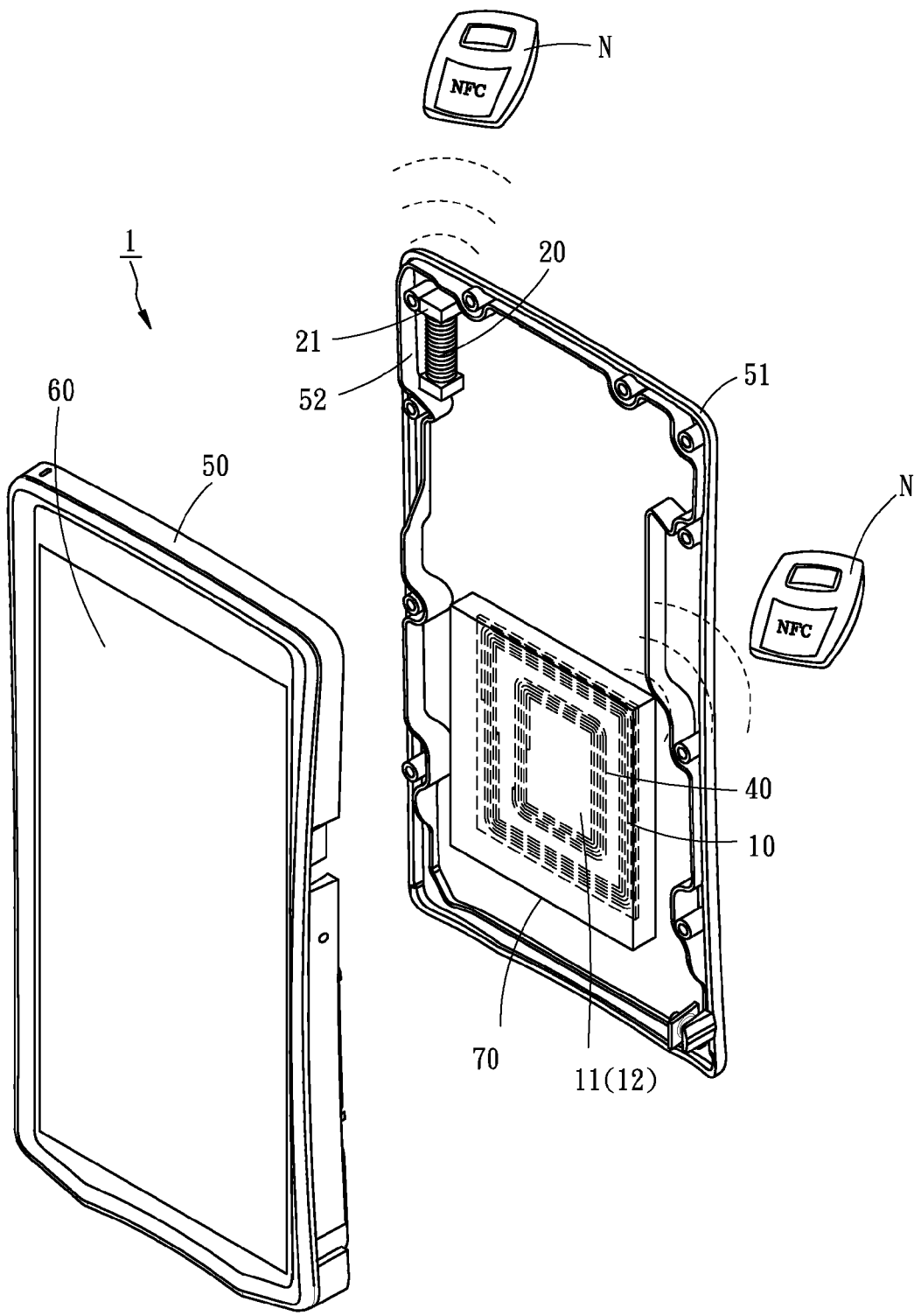
FIG. 3 is an exploded view of the first preferred embodiment of the present invention, illustrating the locations of the first, second, and third NFC antennas.

Referring to FIGS. 1-3, a handheld device having multiple NFC reading directions constructed according to a first preferred embodiment of the present invention is formed of a first NFC antenna 10, a second NFC antenna 20, and a communication unit 30 electrically connected with the first and second NFC antennas 10, 20. The handheld device can be a mobile phone, a tablet computer, or an equivalent device. In this embodiment, the handheld device is a mobile phone 1 as an example and the present invention recited hereunder is based on the direction that a screen 60 of the mobile phone 1 faces forward. The detailed descriptions and operations of these elements as well as their interrelations are recited in the respective paragraphs as follows.

Referring to FIG. 1 again, the first NFC antenna 10 is a coil-wound antenna made of copper foil, surrounding and mounted to a carrier surface 12 of a carrier 11. A third NFC antenna 40 is mounted to a center of the carrier surface 12 and formed of a coil for matching the first NFC antenna 10. Both of the first and third NFC antennas 10, 40 are mounted to the carrier 11, so the limited space inside the mobile phone can be less occupied The second NFC antenna 20 is a winding-type inductive antenna and wound around a bar-shaped strut 21. The second NFC antenna 20 is connected with the third NFC antenna 40 in series and then both are connected with the first NFC antenna 10 in parallel.

The communication unit 30 is an NFC chip and mounted to a main board (not shown), having an input end A and an output end B. The ideal equivalent circuit of an NFC antenna is an inductor, referring to FIG. 2 for an equivalent circuit diagram of the NFC antenna through the communication unit 30. The first NFC antenna 10 is mounted to a first circuit C1. The second and third NFC antennas 20, 40 are mounted to a second circuit C2 in a way that the second and third NFC antennas 20, 40 are connected in series. The communication unit 30 can transmit a communication signal to an external NFC device N, as shown in FIG. 3, outside the mobile phone 1 through the first and second NFC antennas 10, 20. And the communication unit 30 can also receive an input signal inductively coupled by the first NFC antenna 10 or the second NFC antenna 20 through the external NFC device N to make the mobile phone 1 actively or passively exchange data with the external NFC device N.

In this embodiment, the inductance of an NFC antenna to which the communication unit 30 needs to match is 4.7 µH. An inductance L1 of the first NFC antenna 10 is 9.4 µH. An inductance L2 of the second NFC antenna 20 is 4.7 µH. An inductance L3 of the third NFC antenna 40 is 4.7 µH. After the second and third NFC antennas 20, 40 are connected in series, the total inductance is 9.4 µH and the second and third NFC antennas 20, 40 are connected with the first NFC antenna 10 in parallel to make the equivalent inductance of the first NFC antenna 10 in the equivalent circuit be regarded as 4.7 µH. Therefore, the first NFC antenna 10 can match the communication unit 30 and in this way, the communication unit 30 can drive the first and second NFC antennas 10, 20 at the same time. In light of this, the user can optionally make the first NFC antenna 10 or the second NFC antenna 20 of the mobile phone 1 inductively coupled with the input signal emitted by the external NFC device N.

Referring to FIG. 3 again, the mobile phone 1 includes a housing 50 and a rear shell 51, both of which can be combined with each other. The carrier 11 is mounted between the rear shell 51 and a battery 70, so the RF transmission direction of the first NFC antenna 10 is backward. The second NFC antenna 20 is mounted to a corner of the rear shell 51 and adjacent to a top side and a lateral side 52 of the read shell 51. The strut 21 is substantially perpendicular to the top side of the rear shell 51, so the RF transmission direction of the second NFC antenna 20 is upward.

In operation, the first and second NFC antennas 10, 20 are located at different positions inside the mobile phone 1, so the RF transmission directions of the first and second NFC antennas 10, 20 are different from each other. When the user intends to operate the mobile phone 1 to exchange data with the external NFC device N, the user can aim the top side of the mobile phone 1 at the external NFC device N or aim a rear side of the rear shell 51 at the external NFC device N, so the user can choose the first NFC antenna 10 or the second NFC antenna 20 for data exchange with the external NFC device N.

The first NFC antenna 10 or the second NFC antenna 20 can be selected for data exchange with the external NFC device N and the RF transmission directions of both are different from each other, so the mobile phone 1 can have more effective inductive coupling directions for data exchange with the external NFC device N at multiple angles to enhance the operational convenience. The first and second NFC antennas 10, 20 share the communication unit 30, so the cost can be spared.

It is worth mentioning that in this embodiment, the first NFC antenna 10 serves as the primary antenna, the second NFC antenna 20 serves the auxiliary antenna, and the third and second NFC antennas 40, 20 are mounted to the carrier 11 at the same time to make their RF transmission directions the same, so the third NFC antenna 40 primarily serves as inductive matching. One of ordinary skill in the art can change the inductance of the second NFC antenna 20, as it actually depends, to make it identical to that of the first NFC antenna 10, i.e. both are set as 9.4 μH. In this way, the third NFC antenna 40 can be omitted and the first and second NFC antennas 10, 20 can also match the communication unit 30.

In addition, one of ordinary skill in the art can pull the third NFC antenna 40 out of the carrier surface 12 to mount the third NFC antenna 40 to another position of the mobile phone 1 to make the RF transmission direction of the third NFC antenna 40 different from those of the first and second NFC antennas 10, 20. Therefore, the mobile phone 1 can have more effective inductive coupling directions.

A handheld device having multiple NFC reading directions constructed according to a second preferred embodiment of the present invention is similar to that of the first preferred embodiment, having the following difference. In the second preferred embodiment, the rear shell 51 of is made of metal and the carrier 11 is attached to a rear side of the screen 60, so the user can aim a front side of the screen 60 at the external NFC device N for data exchange.

It is to be noted that the positions of the first and second NFC antennas 10, 20 are not limited to what are mentioned in aforesaid two preferred embodiments. For example, one of ordinary skill in the art can transversally place the second NFC device 20 to make the RF transmission direction of the second NFC antenna 20 perpendicular to the lateral side 52 of the mobile phone 1. In addition, the second NFC antenna 20 can be changed to a coil-wound antenna as the same as the first NFC antenna 10.

What is claimed is:

1. A handheld device having multiple near-field communication (NFC) reading directions, comprising:
   a communication unit having an input end and an output end for connection with a first circuit and a second circuit in parallel;
   a first NFC antenna mounted to the first circuit; and
   a second NFC antenna mounted to the second circuit and having a radio frequency (RF) transmission direction different from that of the first NFC antenna;
   wherein an equivalent inductance between the output end and the input end matches the communication unit,
   wherein the second NFC antenna is mounted inside the handheld device and is a winding-type antenna wound around a bar-shaped strut, the strut being longitudinally perpendicular to a top side of the handheld device.

2. The handheld device as defined in claim 1, wherein the first and second circuits have substantial the same equivalent inductances.

3. The handheld device as defined in claim 1 further comprising at least one third NFC antenna connected with the second NFC antenna in series, wherein the RF transmission direction of the third NFC antenna is different from that of the first or second NFC antenna.

4. The handheld device as defined in claim 1 further comprising at least one third NFC antenna and a carrier, wherein the at least one third NFC antenna and the first NFC antenna are mounted to a carrier surface of the carrier.

5. The handheld device as defined in claim 4 further comprising a rear shell and a battery, wherein the battery is mounted inside the handheld device and the carrier is mounted between the rear shell and the battery.

* * * * *